United States Patent [19]

Hardin

[11] Patent Number: 4,685,715
[45] Date of Patent: Aug. 11, 1987

[54] AIR BAFFLE FOR AN OVERLAND VEHICLE

[76] Inventor: Michael L. Hardin, 4724 Ashbury Dr., Jefferson, La. 70121

[21] Appl. No.: 819,310

[22] Filed: Jan. 16, 1986

[51] Int. Cl.⁴ .............................................. B62D 35/00
[52] U.S. Cl. ........................................ 296/1 S; 296/91
[58] Field of Search .................... 296/1 S, 91; 105/2 R

[56] References Cited

U.S. PATENT DOCUMENTS

| | | | |
|---|---|---|---|
| 3,010,754 | 11/1961 | Shumaker | 296/1 S |
| 3,711,146 | 1/1973 | Madzsar et al. | 296/1 S |
| 3,960,402 | 6/1976 | Keck | 296/1 S |
| 4,026,595 | 5/1977 | Jacks | 296/1 S |
| 4,084,846 | 4/1978 | Wiley, Jr. et al. | 296/1 S |
| 4,142,755 | 3/1979 | Keedy | 296/91 X |
| 4,440,433 | 4/1984 | Williams et al. | 296/1 S |
| 4,470,628 | 9/1984 | Husted | 296/1 S |
| 4,518,188 | 5/1985 | Witten | 296/91 X |
| 4,607,874 | 8/1986 | Peairs | 296/1 S |

FOREIGN PATENT DOCUMENTS

| | | | |
|---|---|---|---|
| 0126016 | 11/1984 | European Pat. Off. | 296/1 S |
| 2602580 | 7/1977 | Fed. Rep. of Germany | 296/1 S |
| 2806370 | 3/1979 | Fed. Rep. of Germany | 296/1 S |
| 2497753 | 7/1982 | France | 296/1 S |

Primary Examiner—Johnny D. Cherry
Assistant Examiner—Russell D. Stormer
Attorney, Agent, or Firm—Worrel & Worrel

[57] ABSTRACT

An air baffle apparatus for diverting air around a vehicle being towed, the apparatus having a deflector shield of predetermined dimensions and configuration deployed in an operational attitude to divert air moving along the side of a vehicle; the mounting assembly for the air baffle providing a means for releasably adjusting the air baffle in selected attitudes.

2 Claims, 8 Drawing Figures

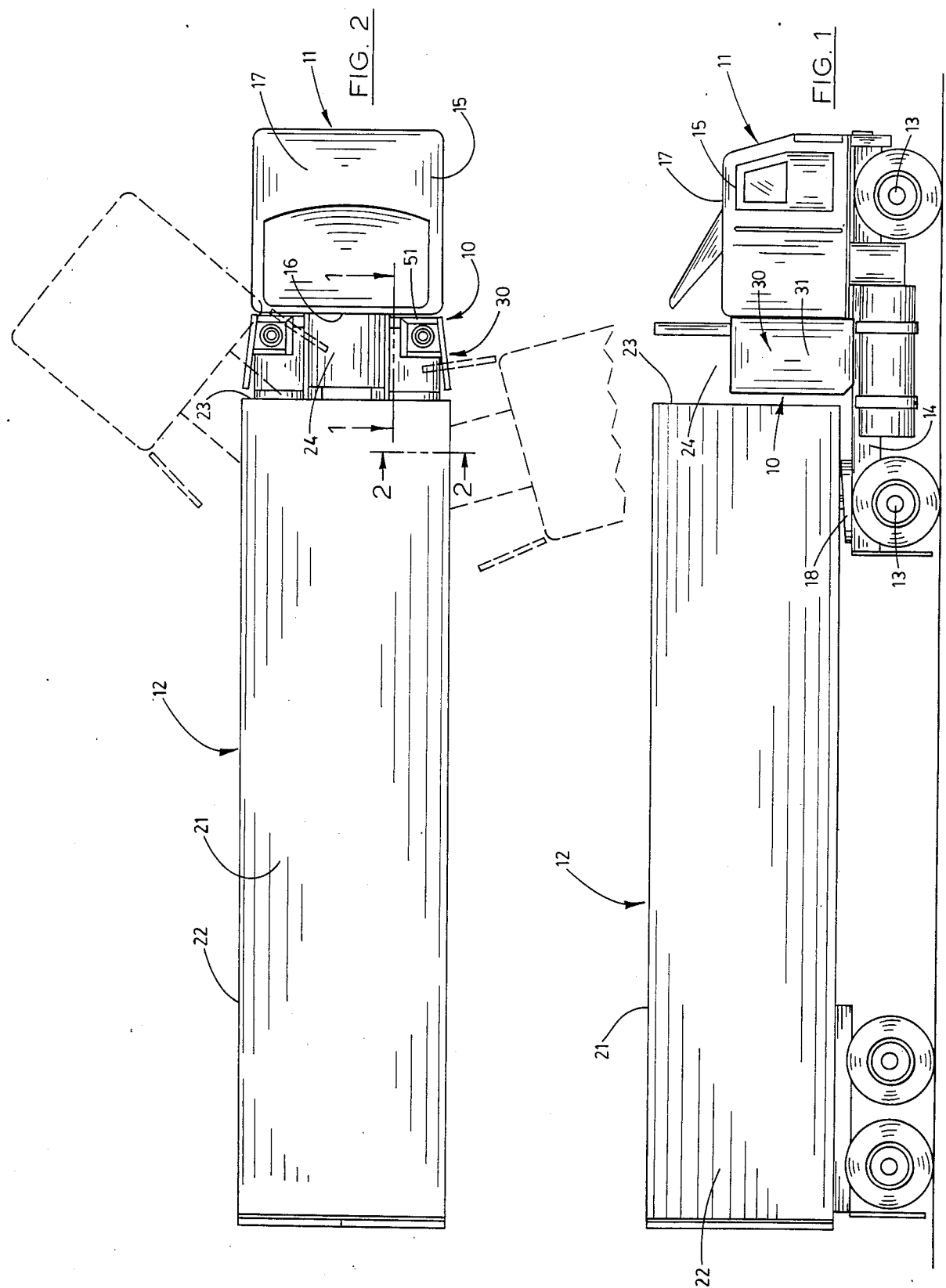

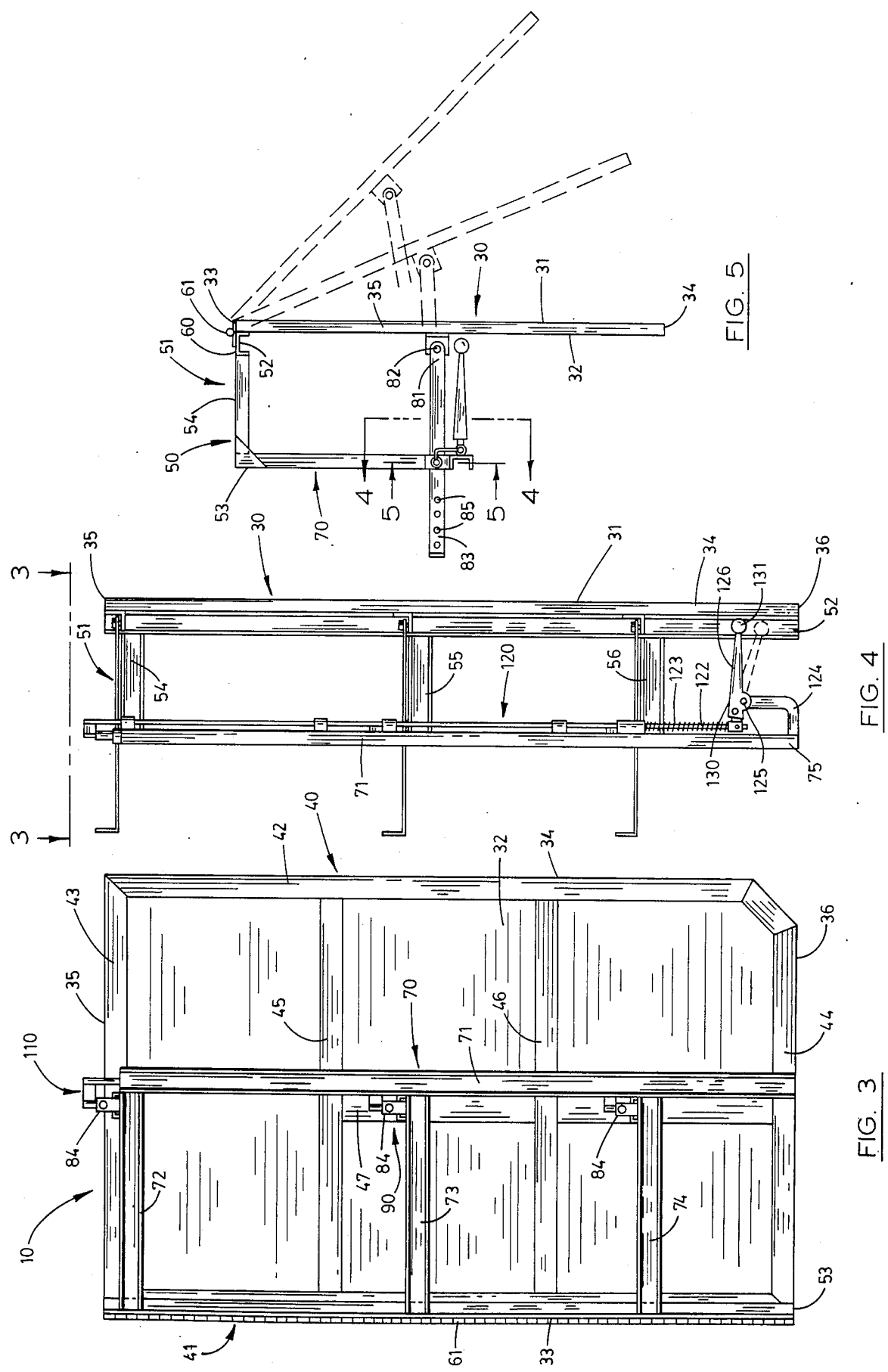

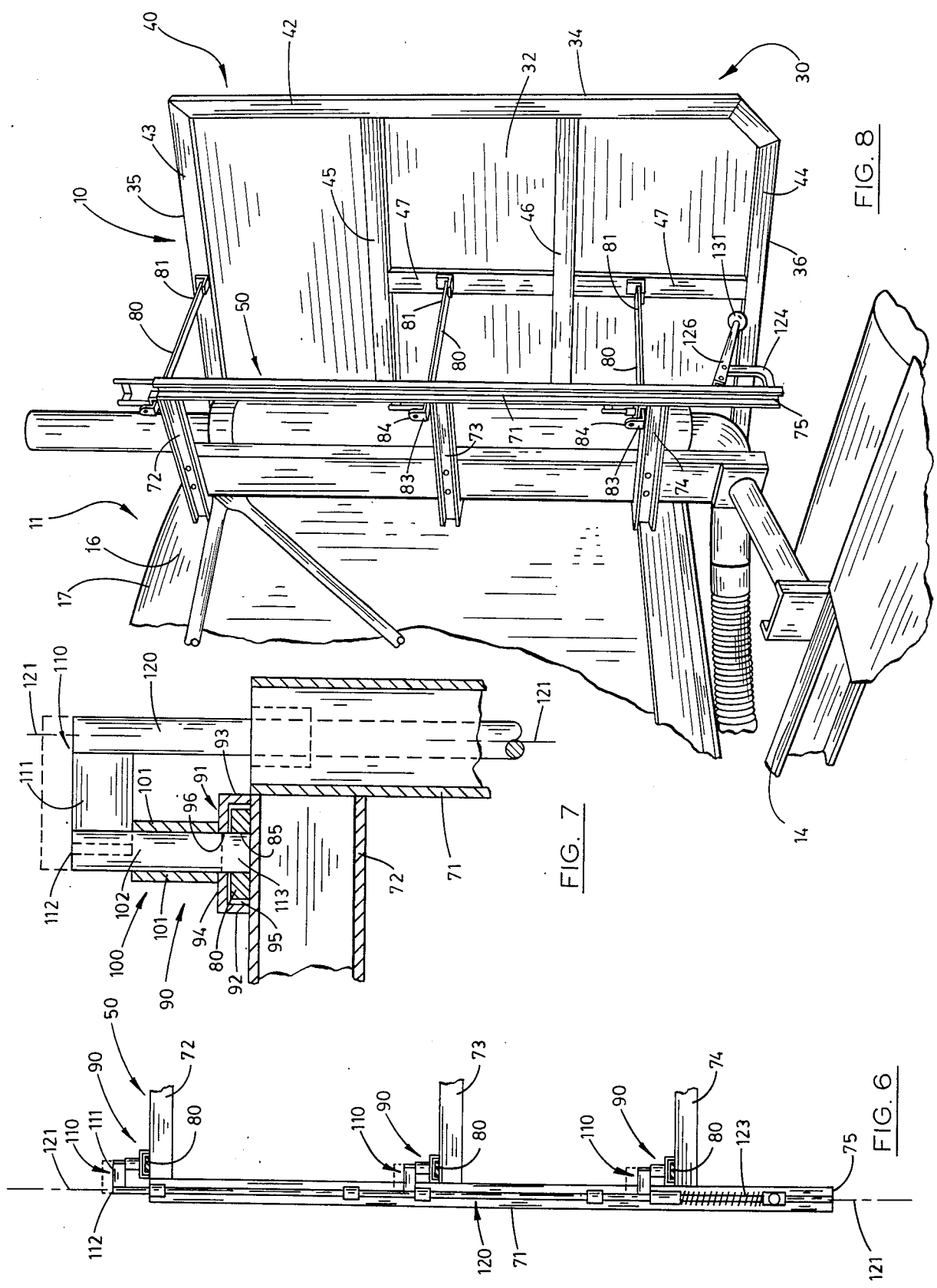

AIR BAFFLE FOR AN OVERLAND VEHICLE

BACKGROUND OF THE INVENTION

1. Field of the Invention.

The present invention relates to an air baffle apparatus for an overland vehicle drawn by a tractor, and more particularly to an air baffle adapted for deployment in a substantially vertical position on the drawing vehicle in releasably adjustable operative attitude to divert air moving along the side of the drawing vehicle and thereafter around the trailer which is being towed, thereby reducing the air resistance, turbulence and drag otherwise experienced by the trailer; the apparatus permitting the towing vehicle to acquire improved performance characteristics as a consequence of its employment.

2. Description of the Prior Art.

It is well known that decreasing the air resistance experienced by an overland vehicle as it travels along at highway speeds results in enhanced fuel economy. In an effort to decrease the wind resistance experienced by an overland vehicle, a variety of different air baffle devices have been employed. These prior art devices operate in a similar fashion whereby the baffle causes air to be deflected around a portion of the overland vehicle for purposes of improving the performance characteristics of the subject vehicle. In the trucking industry, the use of variously designed air baffles, deployed on the tractor, have been employed for purposes of deflecting the air streaming over the top of the vehicle, to cause it to be moved around an accompanying trailer, and as a consequence, to increase the fuel efficiency experienced by the tractor. It should be understood that the prior art air deflectors currently in use are usually deployed on the roof of the tractor to divert air over that portion of the accompanying trailer which extends above the roof of the tractor. The prior art air baffles thus prevent the trailer from capturing air which is streaming over the top surface of the tractor, and as a consequence, the air baffle decreases the wind resistance which is experienced by the tractor-trailer combination.

As may be appreciated, the deployment of the prior art air baffle assemblies on tractor-trailer combinations have produced numerous laudible results; including the increased fuel efficiency of the tractor-trailer combination, and the somewhat improved handling characteristics of the tractor-trailer. It should be understood that the prior art air baffle assemblies deployed on the roof of the tractor cab works well substantially to decrease the wind resistance which the accompanying trailer tends to experience. However, the prior art devices do not sufficiently decrease the wind resistance which is experienced by the tractor-trailer. As an example, tractor-trailer combinations which operate on two-way highways frequently experience significant wind resistance, and turbulence associated therewith, and difficulties of control when they encounter and pass another truck, or tractor-trailer moving in the opposite direction in a closely adjacent lane. It should be understood, that as two tractor-trailers move closely by each other in opposite directions at highway speeds, the operators of these vehicles experience significant wind resistance as the air which is being pushed in front of the passing tractor, and the turbulence associated therewith, moves into the space created therebetween the tractor and the accompanying trailer. When two tractor-trailers pass each other going at high speeds in opposite directions, the venturi effect renders the operation virtually unmanageable. This air and turbulence, in some cases, is somewhat violent, causing the tractor to be slowed suddenly. The rather sudden deceleration causes the tractor and the trailer to sissor in a vertical fashion. It should be understood, that in some circumstances, the creation of this sissoring motion is quite dangerous and can cause the operator of the tractor-trailer to lose control with obvious harmful effects.

While it has been known that the employment of an air baffle will decrease the wind resistance of a vehicle on which it is deployed, such prior art devices have been less than satisfactory for a variety of reasons. For example, the air baffles have tended to be molded, or shaped into a precise form, thus precluding deployment of the air baffle in any position, except the roof of the vehicle, or, the air baffles are not capable of adjustment in an appropriate attitude without the use of tools.

Therefore, it has long been known that it would be desirable to have an air baffle to divert air moving along the side of a tractor wherein the air baffle could be installed on the tractor with minimal alterations to the accompanying tractor and which could thereafter be deployed in an operative attitude with little or no delay in the operation of the tractor-trailer and without the use of any tools.

SUMMARY OF THE INVENTION

It is therefore an object of the present invention to provide an improved air baffle apparatus which can be installed in a vertical fashion on a towing tractor to decrease the wind resistance and turbulence experienced by an accompanying trailer.

Another object is to provide an apparatus which is operable to obtain the benefits derived from an air baffle device while avoiding the detriments individually associated therewith.

Another object is to provide an apparatus which is operable to reduce wind resistance and turbulence experienced by the tractor-trailer and thus increase the overall fuel economy of the tractor-trailer combination.

Another object is to provide an apparatus which is particularly well suited to improving the handling and operational characteristics of a tractor-trailer combination.

Another object is to provide an apparatus which has adjustment means permitting the relatively rapid deployment of the air baffle in an operative attitude appropriate to the trailer width which is being towed by the tractor.

Another object is to provide an apparatus which is of comparatively moderate cost to purchase and maintain and which substantially bolsters the fuel economy of the tractor-trailer combination.

Further objects and advantages are to provide improved elements and arrangements thereof in an air baffle assembly for the purposes intended, which is dependable, economical, durable and fully effective in accomplishing its intended purposes.

These and other objects and advantages are achieved in an air baffle for diversion of air around a vehicle being towed, possessing a deflector shield of predetermined dimensions and configuration, deployed in an operative attitude to divert air moving along the sides of the vehicle; and means for releasably adjusting the air baffle in an appropriate operative attitude.

BRIEF DESCRIPTION OF THE DRAWINGS

FIG. 1 is a side elevational view of the air baffle apparatus embodying the principles of the present invention shown in a typical operative environment mounted on a tractor disposed in towing relation to a trailer.

FIG. 2 is a top plan view of the tractor-trailer shown in FIG. 1 with the tractor shown in phantom lines in alternate left and right positions, the right position being fragmentarily shown.

FIG. 3 is a somewhat enlarged longitudinal, vertical section of the subject apparatus taken on line 3—3 in FIG. 2.

FIG. 4 is a somewhat enlarged transverse, vertical section of the apparatus taken on line 4—4 of FIG. 2.

FIG. 5 is a top plan view of the apparatus taken on line 5—5 of FIG. 4 with the air baffle shown in phantom lines in the alternate positions.

FIG. 6 is a fragmentary, longitudinal vertical section of the apparatus taken on line 6—6 of FIG. 5.

FIG. 7 is a somewhat enlarged, fragmentary, longitudinal vertical section taken on line 7—7 of FIG. 5.

FIG. 8 is a fragmentary perspective view of the apparatus taken from behind the cab of the tractor and inwardly of the right air baffle.

DESCRIPTION OF THE PREFERRED EMBODIMENT

Referring more particularly to the drawings, the air baffle apparatus for diverting air around a vehicle being towed embodying the principles of the present invention is generally indicated by the numeral 10 in FIG. 1.

As shown in FIGS. 1 and 2, for illustrative convenience, the apparatus 10 is mounted on a tractor 11 which is equipped to pull an accompanying trailer 12. The tractor, as best seen in FIG. 1, is of conventional design having a ground-engaging wheel assembly 13, a frame member 14 which is affixed to the groundengaging wheel assembly, and a cab 15 from which the operator controls the tractor. The cab has a rear wall 16 and a cab roof 17. The tractor is equipped with a suitable hitch assembly 18 which is configured releasably to connect the tractor with the trailer.

The trailer 12 is of conventional design having a roof 21, side walls 22 and a front wall 23. Upon releasably connecting a tractor 11 to the trailer, the rear wall 16 of the tractor and the front wall of the trailer define a space 24 where the apparatus 10 is appropriately deployed.

As shown in FIGS. 1 and 8, the apparatus 10 is mounted on the tractor 11 in the space 24 defined by the rear wall 16 and the front wall 23. The air baffle, as illustrated, has a deflector shield 30 of predetermined dimensions and configuration. The deflector shield has an air-engagement surface 31 and an opposed rear surface 32. The deflector shield has a leading edge 33, a trailing edge 34, a top edge 35, and a bottom edge 36. The deflector shield should be manufactured of lightweight, yet rigid materials to permit it to divert air streaming along the sides of the tractor 11 when the tractor is operating at routine highway speeds. In the preferred embodiment, the air-engagement surface utilized is a lightweight, galvanized sheet metal.

The deflector shield 30 is held in rigid, predetermined configuration by a marginal border frame 40. The marginal border frame has a leading edge frame member 41 which is disposed adjacent to the rear wall 16 of the tractor 11. The marginal border frame has a trailing edge member 42 and a top and bottom edge member 43 and 44, respectively. As best seen by reference to FIG. 3, the transverse support members 45 and 46, extend therebetween the leading edge member and the trailing edge member and are suitably affixed thereto by welding or other fastening methods. A vertical brace 47 is welded to the transverse support members. The air engagement surface 31 of the deflector shield is attached to the marginal border frame by welding, or pop rivets. As should be understood by all those skilled in the art, the dimensions and configuration of the air baffle deployed in an operative attitude behind the cab 15 of a tractor will be dependent upon the general design of the tractor cab and also the design of the trailer 12 which is pulled by the tractor. It is possible, therefore, that an air baffle may be shaped somewhat differently than that shown in the drawings; this being a consequence of the peculiar requirements of the vehicle upon which it is being deployed. Moreover, it should be understood that the air baffle can be modified in several ways, for example by installing a plexiglass window in the air baffle to permit the operator of the tractor to see through the baffle, by peering out a window (not shown) which may be present in the rear wall 15 of the cab. Whatever shape the air baffle may take, it must be configured such that it does not substantially interfere with the operation of the tractor. For example, the air baffle must be configured such that the operator can place the tractor in a full jack-knife. As shown in FIG. 2, a tractor is depicted in various attitudes by use of phantom lines to illustrate that the apparatus 10 does not interfere in its operation.

The air baffle apparatus is placed in an operative attitude on a towing overland vehicle such as a tractor 11 by means of a deployment or mounting frame 50 which is adapted to hold the deflector shield 30 in a fixed position on the tractor. The deployment frame, as best seen by reference to FIG. 2, has a first section 51 which is disposed in closely adjacent, substantially parallel spaced relationship to the rear wall 16 of the cab 15. As depicted in FIG. 4, the first section has vertical support members 52 and 53 and horizontal support members 54, 55 and 56. The horizontal and vertical support members are suitably joined together to create a rigid frame. As depicted in FIG. 5, the vertical support member 52 has a first edge 60 which has affixed thereto a continuous or piano hinge 61. This same continuous hinge is suitably connected by conventional fasteners to the leading edge border frame member 41.

The deployment frame 50 has a second section 70 which is disposed in a substantially right angular relationship to the first section 51. The second section, as best seen by reference to FIGS. 3 and 4, has a vertical guide beam 71. The vertical guide beam is affixed to horizontal support members 72, 73 and 74. The horizontal support members are affixed by welding, or conventional fasteners to the vertical support member 53. The vertical guide beam 71 has a first end 75. The deployment frame 50 can be manufactured of any suitable rigid material. In the preferred embodiment, the deployment frame is manufactured of angle iron and steel beam of sufficient gauge to produce a rigid frame which can withstand the pressures it will experience when the air baffle 10 is deployed at highway speeds.

As should be understood by reference to FIG. 8, the deflector shield 30 is mounted on the tractor 11 in a predetermined operative attitude. The deflector shield is held in this operative attitude by the deployment frame 50 which is adapted releasably to interlock a deflector brace 80 which extends from the marginal border frame 40 to hold the deflector shield 30 in the preselected operative attitude. As illustrated in FIG. 8, a plurality of deflector braces have a first end portion 81 that is attached to the top edge border member 43 and to vertical brace 47. The first end is suitably affixed for pivotal motion at a hinge 82 which is of conventional configuration. The deflector braces have a second end portion 83 which is received for substantially slidable movement on the mounting frame 50 and which is appropriately configured to provide a stop 84 which limits the movement of the deflector braces. As best seen by reference to FIG. 5, the deflector braces have formed therein, in predetermined positions, an orifice 85. The position of the orifice corresponds with a preselected operative attitude of the air baffle 10, which is shown in an extended operational attitude, by use of phantom lines, in the same figure.

The deployment frame 50 has located thereon a plurality of locking brackets 90 which are affixed in a preselected position and pattern relative to each other on the horizontal support members 72, 73 and 74 slidably to receive the deflector braces 80. The locking bracket has a first member 91 which has side walls 92 and 93, respectively, and a top wall 94. The side walls and the top wall define a space 95 which is adapted to receive and closely hold a deflector brace. Furthermore, the top wall has formed therein an orifice 96 which extends therethrough the top wall and communicates with the space defined by the walls. It should be understood that the walls are manufactured of materials having sufficient strength to withstand the pressures which will be transmitted from the deflector brace as a consequence of the deflector shield 30 being deployed in an appropriate attitude.

The locking bracket 90 has a second member 100 which is best illustrated in FIG. 7. The second member has a wall 101 which defines a space 102, which directly communicates, and is aligned with the orifice 96 which extends therethrough the top wall 94 of the first member 91. The second member and the space created therebetween the wall of the second member, is dimensioned slidably to receive and closely to hold a locking tab 110. The second member of the locking bracket is affixed to the first member by welding or other suitable fastening means.

The locking tab 110 has a main body 111 and a tab member or pin 112. As best seen by reference to FIG. 7, the tab member or pin has a first end 113 which is dimensioned to be slidably received, and thereafter travel in the space 102 of the second member and through the orifice 96. The orifice 85, which is provided in the deflector brace 80 is dimensioned to receive and closely to hold the first end of the tab member. When interlocked with the locking bracket, the first end of the tab member captures the deflector brace in the locking bracket 90.

The apparatus for releasably interlocking the locking tab 110 with the locking bracket 90 is an operator actuated locking assembly shaft or guide member 120 which is borne by the mounting frame 50 for movement along a path of travel transversely of the deflector brace 80. This is best illustrated by reference to FIG. 7 wherein the movement of the locking tab 110 along the path of travel is shown in phantom lines. As illustrated in FIG. 6, the locking tabs are disposed in predetermined offset positions relative to and along the longitudinal axis 121 of the guide member. It should be understood by reference to FIG. 4, the guide member has a first end 122 which has deployed thereon a spring 123. The spring which is suitably captured about this first end, is adapted to urge the guide member to move in a downward fashion, as indicated by the arrows in FIG. 4. Affixed to the first end of the vertical guide beam 75 is a lever bracket or first portion 124 which is adapted to be grasped by an operator to position the locking assembly in the path of travel. The lever bracket has a pivot point 125. Suitably attached to the pivot point is a lever arm 126. The lever arm has a first end 130 which is pivotally affixed by a suitable fastener to the first end of the guide member. The lever arm has a second end 131, to which an operator can exert physical force to move the guide member in an ascending fashion. As configured, the spring urges the locking tab 110 to releasably interlock with the locking bracket 90.

OPERATION

The operation of the described embodiment of the subject invention is believed readily apparent and is briefly summarized at this point. An air baffle apparatus 10 for use with an overland towing vehicle, such as a tractor 11 and the like, is shown in FIG. 1 in its preferred embodiment. The air baffle 10 has a deflector shield 30. The air baffle is releasably adjusted in a predetermined operational attitude to divert air moving along the side of the tractor around various width trailers 12 which may occasionally be towed by the tractor. As shown in FIG. 8, the deflector shield is deployed in a vertical attitude, and positioned on the towing vehicle by a deployment frame 50. The deployment frame is manufactured of suitable lightweight, yet rigid material. The deployment frame is adapted to releasably interlock a plenary number of deflector braces 80 which extend from the top edge border frame member 43 and the vertical brace 47, to fix the deflector shield in a preselected attitude.

A plurality of locking brackets 90, each having a first member 91, are suitably mounted on the deployment frame in a preselected pattern relative to each other, and are dimensioned slidably to receive a deflector brace 80. A locking tab 110 releasably interlocks the deflector brace in the first member of the locking bracket.

As best seen by reference to FIG. 4, an operator actuated guide member 120 which is slidably mounted on the vertical guide beam 71 is adapted for movement along its longitudinal axis 121 releasably to interlock the locking tab 110 with the locking bracket 90. When properly interlocked, the locking tab captures the deflector brace 80 in the locking bracket. The guide member has a first end 122 which has affixed thereto a spring 123 which urges the guide member to move in a downward fashion.

To place the apparatus 10 into use, the operator of the tractor 11 would press down on the lever arm 126, thus causing the guide member 120 to be moved in an upward fashion, as shown in phantom lines in FIG. 7. This upward movement simultaneously puts spring 123 into compression. The movement of the guide member causes the locking tab 110 which is disposed along the longitudinal axis 121 in a predetermined position to move in similar fashion. As the locking tab is urged upwardly, the tab member 112 is moved out of interlocking engagement with an orifice 85 which extends therethrough the deflector brace 80. After disengagement of the first end of 113 of the tab member from the orifice 85, the deflector brace is no longer captured in the locking bracket 90. The operator is thereafter free to move the deflector shield 30 to an appropriate attitude which will deflect air around the trailer 12 which is to be towed by the tractor. Upon positioning the deflector shield in an appropriate attitude, the operator releases the lever arm. The spring which has been placed under compression causes the guide member to be urged downwardly. The movement of the guide member in this downward fashion, in response to the expansion of the spring, causes the first end of the tab member to be moved therethrough another orifice 85 in the deflector brace. Upon passing into interlocking relationship with the orifice, the deflector brace is thereafter captured in the locking bracket until the operator redeploys the deflector shield in another attitude.

As should be understood, the air baffle apparatus 10 of the present invention can be adapted for appropriate installation on a wide variety of overland vehicles. In addition, the apparatus can operate cooperatively with other devices which may be installed on the tractor 11. The apparatus is easily removed for maintenance after installation and can be constructed and installed at a moderate price as compared with prior art devices used for similar purposes.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An adjustable air baffle apparatus for a vehicle comprising:
   A. a deflector shield adapted to divert air impinging thereagainst;
   B. a mounting frame mounting the deflector shield thereon for movement relative thereto and itself adapted to be mounted on a vehicle in supporting relation to the deflector shield;
   C. a brace having a first end portion mounted for substantially pivotal movement on the deflector shield and having a second end portion received for substantially slidable movement on the mounting frame; and
   D. a locking assembly borne by the mounting frame including a shaft movable along a path of travel offset relative to the brace and a locking pin mounted on the shaft and offset relative to the shaft for movement with the shaft into engagement with the brace to lock said brace relative to the mounting frame, whereby the deflector shield is retained in a selected position, and for movement with said shaft from engagement with the brace to allow said slidable movement of the brace for repositioning of the deflector shield.

2. An adjustable air baffle apparatus for diverting air around the side of a vehicle being towed by a towing vehicle, the apparatus comprising:
   a deflector shield for mounting on a towing vehicle for diverting air impinging thereaginst;
   a deployment frame having a first section adapted to be mounted in a space between the towing vehicle and the towed vehicle, said first section mounting the deflector shield for substantially pivotal movement about a substantially vertical axis, a second section having a substantially vertical guide beam, and a plurality of support members mounted on the first section in supporting relation to said second section;
   a plurality of braces having first ends which are pivotally mounted on the deflector shield and second ends providing stops for limiting the motion of the deflector shield beyond a predetermined position, the braces each having formed therein a plurality of orifices positioned to define predetermined operative attitudes for the deflector shield;
   a plurality of locking brackets individually mounted on the support members, each of said brackets having a brace slidably received therein and having an orifice extending therein for selective registry with an orifice of the brace slidably received therein;
   a guide member, having a longitudinal axis, slidably mounted on the vertical guide beam and movable in ascending descending fashion and having an end portion mounting a spring assembly adapted resiliently to urge the guide member to move in a descending fashion;
   a lever arm assembly connected to the guide member operable to urge the guide member to move in ascending fashion against pressure of the spring assembly; and
   a plurality of locking pins mounted on the guide member in predetermined positions along the longitudinal axis of the guide member, each locking pin dimensioned and positioned slidably to be received in the orifice of one of said locking brackets disengageable from the brace thereof when the guide member is moved in ascending fashion and engageable with a selected orifice of said brace when the guide member is moved in descending fashion, whereby the deflector shield can releasibly be locked in a selected position.

* * * * *